C. OWENS.
TRACTOR PLOW.
APPLICATION FILED JUNE 5, 1920.
1,396,049.
Patented Nov. 8, 1921.
2 SHEETS—SHEET 1.
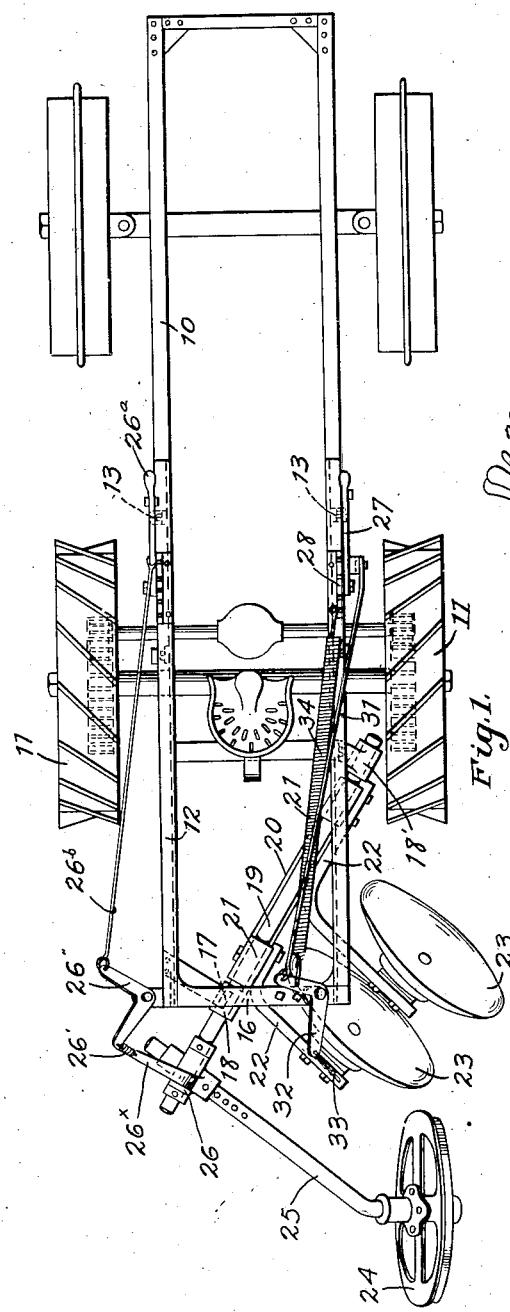
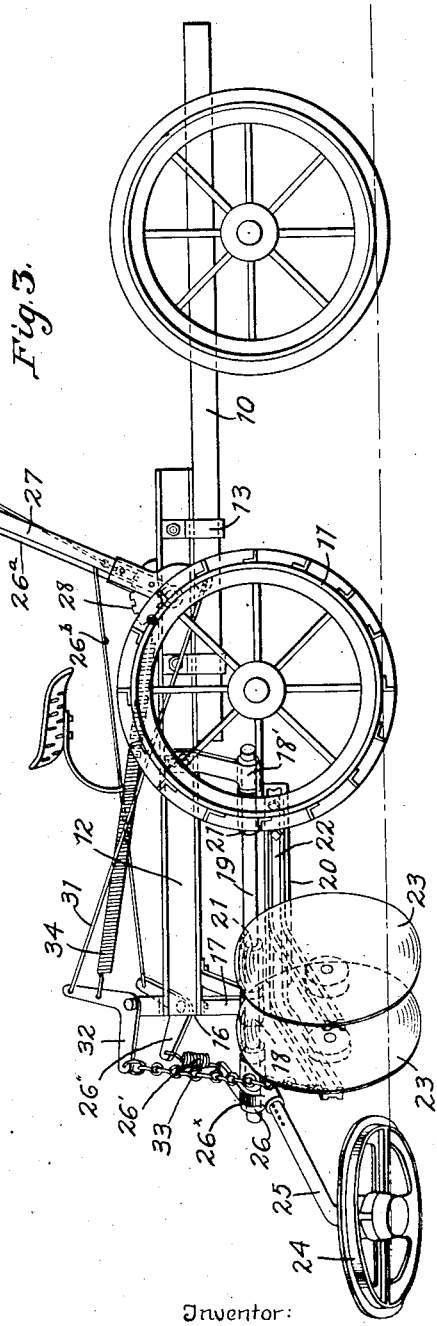
Inventor:
Charles Owens

UNITED STATES PATENT OFFICE.

CHARLES OWENS, OF CHATTANOOGA, TENNESSEE.

TRACTOR-PLOW.

1,396,049.   Specification of Letters Patent.   Patented Nov. 8, 1921.

Original application filed October 27, 1919, Serial No. 333,512. Divided and this application filed June 5, 1920. Serial No. 386,737.

*To all whom it may concern:*

Be it known that I, CHARLES OWENS, a citizen of the United States, and resident of Chattanooga, Tennessee, have invented certain new and useful Improvements in Tractor-Plows, of which the following is a specification.

This application is a division of that filed Oct. 27, 1919, No. 333,512.

My invention relates to plows and concerns particularly a furrow wheel organization by which the furrow wheel will be automatically controlled as well as controlled by hand, in order to perform its functions properly and maintain its control upon the plow under different conditions of work.

The invention is shown in the accompanying drawings in which—

Figure 1 is a plan view of one form of plow to which my invention is applicable.

Figure 2:
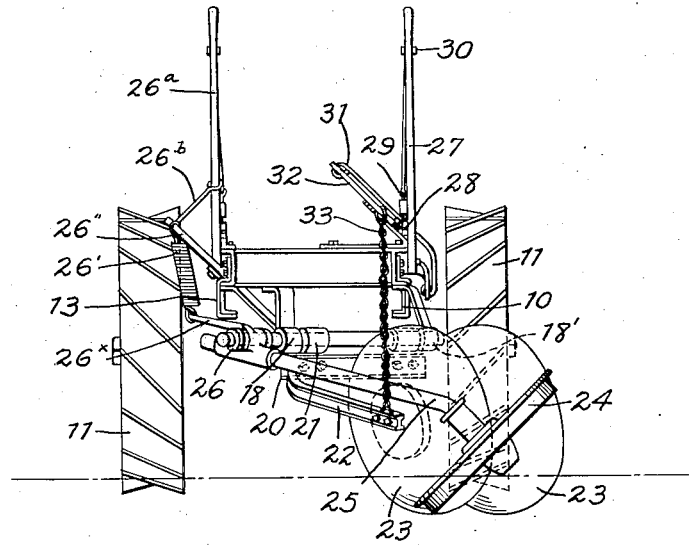
Fig. 2 is a rear view of Fig. 1, Fig. 3 a side view of Fig. 1.
Figure 4:
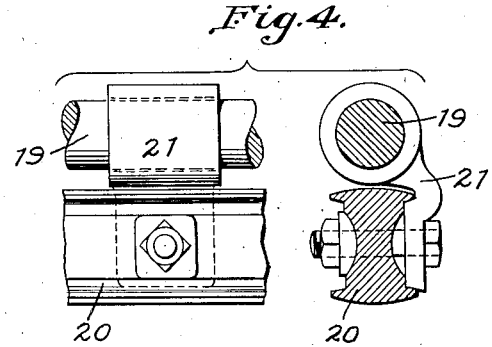
Fig. 4 shows details.

It will be understood that the invention is applicable to forms of plows other than that shown and described herein and the illustration and description are to be regarded as means of illustrating the principles involved in my invention and not as being restrictive upon the scope of the claims.

I show at 10 the frame of the tractor which has traction wheels 11 and which is provided with the ordinary driving mechanism. To the rear end of the frame 10 is attached a supplemental frame or beam 12 by means of clamp members 13. This frame or beam is made up of two side members connected by a cross member 16. Depending from this cross member there is a bracket 17 having a bearing 18 at its lower end for a shaft or rod 19, the other end of which finds a bearing in the member 18' connected with one of the side bars of the supplemental frame or beam 12. On this rod or shaft 19 there is hung a frame 20 by means of hangers 21 and to this frame are secured brackets or arms 22 which carry the disk plows 23. The furrow wheel is shown at 24 carried by an arm 25 which in turn is adjustably supported by a bracket 26 turnable about the rod 19. The bracket 26 has an arm 26ˣ to which is attached a spring 26' extending from a bell crank lever 26'' operable from a hand lever 26ᵃ by a rod 26ᵇ. The hand lever is combined with the usual toothed segment and lock by which it may be set and held in any desired position. The spring forms a link between the bell crank lever and the bracket by which the bracket may be turned to throw the furrow wheel down to its work. The disk plows can be adjusted as to inclination by raising or lowering their supports or rather turning them about the axis of the shaft 19 and for this purpose a lever 27 is provided pivotally mounted at its lower end and working along side of a segment 28 to which it may be locked at different angular positions by means of the locking bolt 29 which is controlled from the finger lever 30 as is customary in this class of implements.

The lever 27 is connected by a link 31 with a bell crank lever 32 pivotally mounted on the frame and connected by a chain 33 with one of the brackets or frame members which support the disk so that by operating the handle 27 the disk carrying frame may be adjusted about the axis of the shaft 19 and thus the disk plows can be adjusted as required. A spring 34 serves to balance the weight of the plow. This spring is attached to the bell crank lever 32 at one end and to a suitable fixed part of the frame at the other end.

In the operation of this implement as the disks are swung around beneath the center of the shaft 19 the tractive effect of the traction wheels is increased, and thus downward thrust will be imposed on the rear end of the tractor and its traction wheels to get a tractive engagement with the ground exceeding that which would be due merely to the weight of the main tractor and that of the attached implement. I would point out, however, that an advantage is desired from attaching the supplemental frame 12 with the disk plows and associated parts as a trailer to the main tractor because the weight of these parts is imposed on the main tractor at just the point where this weight will be most effective in increasing the tread weight of the main tractor. That is, this weight will be imposed at a point near the traction wheels and will not be taken mainly or in large part by the front wheels of the tractor, and thus these front wheels will offer a minimum resistance to the forward motion of the tractor as they will be comparatively lightly loaded while the rear wheels will be heavily loaded and their tractive action will be increased.

The principle above explained of imposing tread weight on the traction wheels by attaching the plow implement as a trailer, can be carried out in connection with a plow attachment having a frame of its own carried by wheels, the frame being attached to the main frame of the tractor to impose the weight thereon and to impose the thrust of the plow in the ground thereon.

Reverting to the use of the spring 26' it will be observed that by turning the bell crank lever so as to draw upon or tension this spring, the bracket 26 will be turned to throw the arm 25 with the furrow wheel downwardly. The tension of the spring is at all times under the control of the operator by means of the hand lever and intermediate connections. The object of this construction is to control the side thrust of the disks independent of the disks themselves, to meet the conditions of changing from one depth of plowing to another, plowing in hard dry soil or when a greater number of disks are employed.

One serious fault with all disk plows or with mold board plows having no landside is their tendency to side draft, this being especially true of disk plows. Whenever the disks encounter hard material or a stone of sufficient size to be thrown out of the ground the furrow wheel if mounted in the ordinary way will rise out of the furrow and the plow then having no part bearing against the land it will jump sidewise and the continuity of the furrow will be destroyed at this point. With my improvement, however, in which the spring 26' stretched to considerable tension is tending to force the furrow wheel down, the rise of the disks will not result in lifting the furrow wheel which will be held at the bottom of the furrow by the spring 26' tending to relax.

It will be observed that the plow disks 23 or shares are carried by a frame which is supported not only by the traction wheels 11 but by the front wheels shown and that the furrow wheel plays no part in supporting the plow frame. Also that this furrow wheel and its mounting are not in the form of a caster wheel and the mounting does not turn about a vertical axis offset from the vertical plane in which the axis of the wheel lies. By my construction the furrow wheel is inclined to the line of draft and it can roll with its periphery against the land side while down in the furrow, and can thus effectually resist any tendency for the rear end of the plow frame to swing around, should the disk or share rise out of the furrow. A caster wheel being hung on an offset vertical pivot can swing as a whole around this pivot, which it would do if pressure is exerted laterally thereof, and thus such caster wheel would be in position to roll up out of the furrow and would not serve to hold the plow to its course.

I claim as my invention:

1. In combination in a plow, a frame, a plow body, a furrow wheel in rear of the plow body to run in the furrow being formed, a spring for forcing said furrow wheel to its work downwardly and laterally of the furrow independently of the plow body, and means for applying tension to the said spring, said means consisting of a lever and a bell crank for stretching the spring in initially forcing the furrow wheel down, substantially as described.

2. In combination in a plow, a frame, a plow body, a furrow wheel in rear of the plow body, free to swing downwardly independently of the plow body, said furrow wheel being inclined laterally to the line of draft to roll with its lower edge on the landside within the furrow being formed and thus sustain lateral thrust, a support for said wheel, a substantially horizontal pivot about which said support turns, and a spring for forcing the furrow wheel downwardly, relative to the plow body should this rise.

3. In combination in a plow, a frame, a plow body, a furrow wheel in rear of the plow body free to swing downwardly independently of the plow body, said furrow wheel being inclined laterally to the line of draft to roll with its lower edge on the landside within the furrow being formed, a support for said wheel extending therefrom transversely of the furrow toward the landside, a substantially horizontal pivot for the landside end of said support, and a spring for forcing the furrow wheel down, relative to the plow body should this rise.

4. In combination in a plow, a frame, carrying wheels therefor, a plow body, a furrow wheel in rear of the plow body, an arm carrying said furrow wheel at one end extending laterally therefrom toward the landside and pivotally mounted intermediate of its length to move in a vertical plane substantially transverse to the furrow, a spring connection with the other end of said arm and extending upwardly therefrom, connections for drawing upwardly upon said spring for stretching the same and forcing the furrow wheel to its work, said spring on relaxing due to the rise of the plow in relation to the bottom of the furrow keeping the furrow wheel down, substantially as described.

In testimony whereof, I affix my signature.

CHARLES OWENS.